UNITED STATES PATENT OFFICE 2,582,416

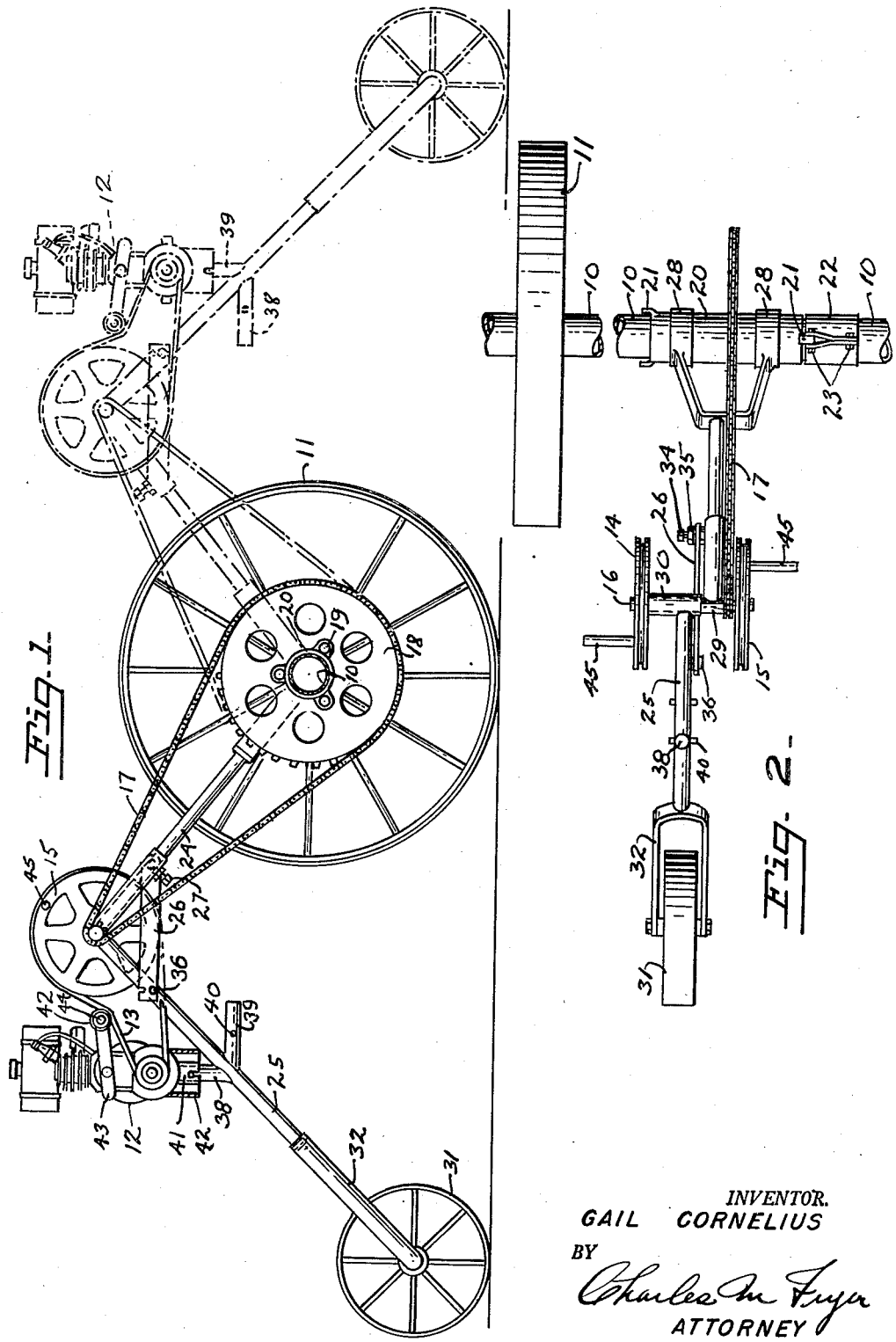

POWER DRIVE MEANS FOR IRRIGATION PIPE

Gail Cornelius, Portland, Oreg., assignor to R. M. Wade & Co., Portland, Oreg., a corporation of Oregon Application August 7, 1950, Serial No. 178,139

5 Claims. (Cl. 180—11)

This invention relates to irrigation systems of the sprinkler type wherein a long pipe carries and supplies water to spaced sprinklers supported by it. The invention is particularly concerned with the movement or advancing of such a pipe to the successive positions which it must occupy in the course of irrigating an entire field.

In practice, sprinkler type irrigation equipment comprises a feed pipe disposed along one boundary line in the field. This pipe is in communication with a pump or other source of water under pressure and has outlets spaced throughout its length. A lateral pipe extends from any one of these outlets across the field at right angles to the feed pipe and carries spaced sprinklers. Consequently, upon moving the lateral pipe from one outlet to the next throughout the length of the feed pipe, the entire field may be supplied with moisture from the sprinklers. Movement of the lateral pipe has been accomplished in many ways. In some cases, it is disjointed and manually transported to its new location and in some cases, long lengths of the pipe are dragged to the new position by a tractor. Systems are also in use where the lateral pipe is supported on wheels with the pipe passing through the hub portion of the wheels. With such a system, the entire length of pipe which may extend for a thousand feet or more can be advanced across the field by rolling as a single unit. The pipe is usually advanced about sixty feet at a time and when it has reached the last position, must often be returned the full length of the field which may be several hundred feet. This constitutes a tedious task when performed manually or with the aid of ratchets or other leverage applying devices.

The present invention is concerned with the application of motive power to a wheel type irrigation system and it is the object of the invention to provide a simple inexpensive means for applying such motive power and for rendering it readily reversible when required. Other and more specific objects and advantages of the invention and the manner in which the invention is carried into practice are set forth in the following specification wherein reference is made to the accompanying drawings.

In the drawings:

Fig. 1 is a view in side elevation of power drive means for irrigation pipe embodying the present invention, and illustrating in broken lines the same drive means in a reversed position; and Fig. 2 is a plan view of the apparatus illustrated in Fig. 1.

Referring to the drawings in detail, a short section of a long irrigation pipe is indicated at 10 as being supported on wheels, one of which is shown at 11. The wheels are arranged at suitable intervals throughout the entire length of the pipe and are non-rotatably fixed to the pipe by means not shown so that when any part of the pipe is rotated, the wheels travel over the surface of the ground to move the pipe from one location to another.

According to the present invention, the pipe is rotated or driven by power means here shown as a small gasoline engine 12. A conventional belt 13 transmits power from the engine to either one of a pair of pulleys 14 or 15. The pulleys 14 and 15 are fixed to a common shaft 16 also carrying a small sprocket as shown for transmission of power to a chain 17 passing over a large sprocket 18 supported as by bolts 19 on a set of lugs which project radially from a hollow journal member 20. The journal member 20 is provided to protect the pipe, which is of light aluminum construction or the like, and to impart rotating movement to the pipe without injuring it.

In order to fix the journal member 20 against rotation on the pipe, it is provided with pairs of lugs 21 projecting from its ends and these lugs extend into recesses in a two-part clamp 22 which embraces the pipe and is secured thereon as by bolts shown at 23. In the present illustration, such a clamp is illustrated at one end of the hollow journal member 20 but a similar clamp may be arranged at its opposite end and will serve to prevent longitudinal sliding movement of the journal member on the pipe as well as relative rotation of the journal member and the pipe.

The engine 12 is supported on an A frame which serves to react the torque of the driving power to the ground and comprises a leg part 24, a second leg part 25 and a cross brace 26 connecting the leg parts 24 and 25. The leg part 24 is preferably of telescoping construction to enable adjustment of its length and is fixed in its adjusted position by means of a set screw 27. At its lower end, it is forked as indicated in Fig. 2 and carries a pair of bearings 28 which surround the journal 20 and permit it to rotate. At its upper end, the leg part 24 carries a T-shaped fitting 29 through which the shaft 16 extends for free rotary movement.

The other leg part 25 also has a fitting 30 at its upper end rotatably embracing the shaft 16 and at its lower end carries a ground engaging wheel 31 by means of a conventional forked bearing bracket 32. The legs 24 and 25 are held in their angularly related positions by the cross brace 26 which serves as a latch. The brace 26 as best shown in Fig. 2 is pivotally supported with respect to the leg 24 by means of a bolt 34 with a lock nut 35 thereon. The opposite end of the brace 26 is notched for engagement with a pin 36 so that the brace serves to prevent spreading of the legs 24 and 25 with respect to each other. The lock nut 35 may be tightened to hold the brace in place.

The leg 25 also carries a pair of engine supports in the form of posts 38 and 39 each provided with a transversely extending pin 40. A tube 41 is secured to the bottom of the engine and is notched at its lower edges to receive the pin 40 so that the engine is held in a vertical position by the telescoping fit of the tube 41 over the posts 38 or 39 and rotation of the engine on its vertical support is prevented by the engagement of the pin 40 in the notches. For convenience in handling the engine, a larger tube 42 surrounds the tube 41 and provides a base upon which the engine may be set in an upright position. A belt tightener comprising a pulley 42 on a lever 43 pivoted to the engine serves as a clutch so that the motor may be started with a slipping belt. A handle 44 is pressed downwardly to tighten the belt and as long as the operator holds the belt tight the engine will drive the pipe. This provides a safety feature as the device will automatically stop if the operator stumbles or for any other reason is not in close attendance. In operation, the device may be set up as shown in full lines in Fig. 1 and the drive will be imparted to the pipe in a right hand direction. A driving torque is reacted through the frame and ground wheel 31. However, were the drive to be reversed with the parts in this position, the torque would be reacted in an opposite direction and it would be possible for the entire framework comprising the legs 24 and 25 to swing upwardly and over the pipe which would be dangerous and impractical. Consequently when it is desired to reverse the direction of the pipe, the framework is reversed to the broken line position illustrated in Fig. 1 by first releasing the latch-like brace 26 and then reengaging it in the opposite position. The engine is then supported on the post 39 instead of the post 38 and the drive belt is led to the opposite one of the two large pulleys 14 and 15. Each of these pulleys 14 and 15 is provided with a hand crank as shown at 45 so that manual adjustment of the position of the pipe may be accomplished when it is not being driven by the engine. This is desirable because, as previously explained, the pipe carries sprinkler units which are preferably directed upwardly during the sprinkling operation. Slight rolling of the pipe accomplished by manual adjustment through the cranks 45 will serve to bring the sprinkler units into their proper positions.

An engine of no more than one and one half horse power and sufficiently light to be easily carried by an operator affords sufficient power to move a thousand feet of four inch pipe including the wheels, sprinklers and other necessary mechanism at a speed comparable to a moderately fast walk and the engine is preferably removed or covered during the sprinkling operation to protect it from moisture.

I claim:

1. Drive means for an irrigation pipe supported on wheels which comprises a frame for supporting a driving engine, a pivotal connection between the frame and pipe enabling the frame to be swung to either side of the pipe, a wheel on the frame to engage the ground in either position of the frame, supporting means for the engine in either position of the frame and means forming a driving connection between the engine and the pipe supporting wheels.

2. Drive means for an irrigation pipe supported on wheels which comprises a frame for supporting a driving engine, a pivotal connection between the frame and pipe enabling the frame to be swung to either side of the pipe, a wheel on the frame to engage the ground in either position of the frame, supporting means for the engine in either position of the frame, and driving connections operable in either position of the frame between the engine and the pipe.

3. In a support for an engine to drive a pipe supported on wheels, a frame comprising one leg part pivoted at one end to the pipe, one leg part having a ground engaging wheel, a pivotal connection between said leg parts, a detachable brace connecting said leg parts to hold them in angularly related positions and to enable them to be swung to comparable positions at either side of the pipe and driving connections between the engine and the pipe.

4. In a support for an engine to drive a pipe supported on wheels, a frame comprising one leg part pivoted at one end to the pipe and inclined upwardly away from the pipe, a second leg part pivoted to the upper end of the first part and inclined downwardly, a ground engaging wheel at the lower end of the second leg part, a brace pivoted to one leg part and detachably connected to the other leg part for holding them in position and enabling them to be swung to the same relative positions on the opposite sides of the pipe and driving connections between the engine and the pipe.

5. In a support for an engine to drive a pipe supported on wheels, a frame comprising one leg part pivoted at one end to the pipe and inclined upwardly away from the pipe, a second leg part pivoted to the upper end of the first part and inclined downwardly, a ground engaging wheel at the lower end of the second leg part, a brace pivoted to one leg part and detachably connected to the other leg part for holding them in position and enabling them to be swung to the same relative positions on the opposite sides of the pipe, engine supporting means on the second leg part to hold an engine in an upright position when the frame is on either side of the pipe and driving connections between the engine and the pipe.

GAIL CORNELIUS.

REFERENCES CITED

The following references are of record in the file of this patent:

UNITED STATES PATENTS

| Number | Name | Date |
|---|---|---|
| 686,310 | Lawson | Nov. 12, 1901 |
| 947,444 | Jeszenszky | Jan. 25, 1910 |